Nov. 14, 1967  Y. J. F. LECOUFFE  3,352,721
METHOD OF MAKING A BATTERY
Filed May 14, 1965

INVENTOR
YVES JACQUES FELIX LECOUFFE
BY Kenyon & Kenyon
ATTORNEYS

United States Patent Office 3,352,721
Patented Nov. 14, 1967

3,352,721
METHOD OF MAKING A BATTERY
Yves Jacques Felix Lecouffe, Courbevoie, France, assignor to Societe des Accumulateurs Fixes et de Traction (Societe Anonyme), Romainville, France, a company of France
Filed May 14, 1965, Ser. No. 455,885
Claims priority, application France, June 3, 1964, 976,903
6 Claims. (Cl. 136—175)

ABSTRACT OF THE DISCLOSURE

A battery consisting of a group of cells held together by having corresponding of their ends embedded in an insulative member of relatively small depth formed in situ of thermosetting resin polymerizable at room temperatures which also serves to space the cells apart to provide for air circulation between cells, with connecting terminals at the other ends of the cells and said other ends likewise embedded in a similar insulative member also of relatively small depth, and method of forming the insulative members about said battery ends by casting in a mold applied successively to opposite ends of the battery into which the thermosetting resin is poured to selected depth and permitted to polymerize and set at ambient room temperature.

---

This invention relates to the assembly of an hermetically tight electrical battery from a group of any number of sealed electrochemical cells such as primary or preferably secondary cells which may be electrically connected together in any useful way in order to obtain a desired battery either with series or parallel or series-parallel connected cells.

According to a feature of this invention the individual cells of a group are juxtaposed and maintained in such assembled condition by means of at least one insulative plate of resinous material formed in situ. Preferably these juxtaposed cells are maintained together at one e.g. their lower ends, by a first such plate and at their other e.g. upper ends by another such plate in which the electrical connections between the cells are advantageously embedded and which is spaced from the first end plate.

With such arrangment the cells of the group are rigidly maintained in their desired positions and do not require any further casing to constitute the desired battery.

As another feature of the invention, the electrical connections between the cells of the group, having been effected prior to molding in situ of at least one of the resinous plates, are embedded in the insulative resin thereof and thus are fully protected against short-circuiting or damage. The soldered or welded electrical unions of these connections with appropriate cell terminals thus are not subjectable to any strain and thus no risk of breaks occurs, thereby insuring perfect reliability in the operation of the battery of assembled cells. Moreover, as all cell terminals are covered by the said second resinous plate and the connections are embedded therein, electrical sparks or fortuitous short circuiting of naked terminals or circuit connections as by accidental contact with extraneous metal pieces are prevented.

Additionally as another object and feature of the invention, since sealing tightness of the individual cells which is generally effected by a gasket maintained in a crimped upper part of the cell or in other ways, is that this seal is made hermetic by the embedment of the said upper part of the cell in the upper resinous plate. Thus cell leakage is prevented even if the gasket proves defective, or if the said gasket is unable itself to insure hermetic tightness.

The upper and lower resinous plates each may be of relatively small depth thus lightening the assembly. On the other hand, since the major portions of the juxtaposed cells are not enclosed in a box or casing they present a large cooling area and air can freely circulate around them. This is of great advantage for sealed secondary cells which heat upon overcharge.

The resins particularly useful for molding such plates are advantageously thermosetting, preferably of the epoxy type which may be polymerized at ambient or room temperatures and are rigid and strong. This is particularly desirable because the active material components of the cells would undergo the risk of being damaged if heat were required for polymerization. A suitable thermosetting resin of the epoxy type capable of polymerization at ambient or room temperatures is: "Scotch Cast" a thermosetting resin of the epoxy type manufactured and sold by Minnesota Mining & Mfg. Co., which is capable of polymerizing at ambient or room temperatures. Any other thermosetting resin of the epoxy type or other resin having the properties enumerated therein may be used in place thereof.

If the resin which is selected is sufficiently rigid, resistant and resilient after polymerization, the assembled battery will be very rugged and shock-proof. It can be dropped on a hard surface without damage to the cells.

Moreover, if the selected resin is substantially transparent or translucent after polymerization the embedded connections in one or the other of the end plates will be visible or at least semi-visible.

The end plates or either of them can have indicia applied thereto either and preferably during molding, or subsequently as by engraving or the like to show polarities, voltages, capacities, trademarks and directions for use or other desirable notations.

Other objects and features of the invention will become apparent from the following specification and accompanying drawings forming a part hereof and wherein.

In the embodiment shown the battery B is comprised of six individual juxtaposed sealed cells 1 preferably, though not necessarily, of the secondary type. As shown, these cells 1 are substantially cylindrical with circular cross section, but may have oval section or have prismatic such as rectangular or hexagonal section. In such cells 1 the electrodes (not shown) may be spirally wound for example in the manner of U.S. Patents 2,991,324; 3,059,041 or the copending application S.N. 284,697, filed May 31, 1963, and now abandoned, assigned to the same assignee. The particular arrangement of the electrodes is of no material consequence and this invention is applicable for use with any type of primary or secondary cell having a configuration such as hereinabove described.

Figure 3:
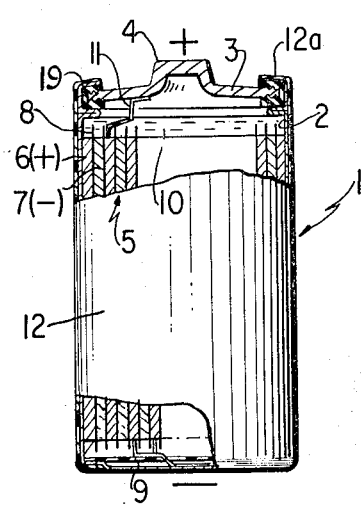
FIG. 3 is a vertical section through a cell that may be used in practicing this invention.

For example, a cell suitable for practicing this invention may as seen in FIG. 3 comprise a metallic cup-like cylindrical metallic casing 2, a cover 3 having a centrally located contact boss 4 and a coil 5 consisting of spirally interwound positive and negative electrodes 6 and 7, spaced by a suitable separator 8. The outermost negative electrode 6 may be in contact with the sides of casing 2 which thus forms the negative terminal of the cell. The coil 5 may be insulated from the bottom of casing 2 as by disc 9 of insulating material and cover 3 is insulated from casing 2 by a molded gasket 19. Appropriate electrolyte 10 is also provided in cell 1. The positive electrode is connected electrically to the cover 3 as by a conduit 11 or in any other suitable way. A suitable jacket 12 of insulating material may surround the cell being turned over at 12a about the cover 3 and at 12b about the base of cup 2. Any other primary or secondary cell having desirable configuration may be utilized for practicing this invention and the described cell is presented by way of example only without limitation of any kind thereto. A suitable connecting conduit or wire 13 may be welded or soldered to the outer surface of cup 2 for purposes presently to be described.

In assembling a group of cells 1 to form the battery B of this invention, a suitable shallow mold 14 that may be rectangular in shape is provided. A thin layer 15a of the thermosetting epoxy type resin hereinbefore described to a selected depth for example of approximately 2 mm. is poured into or otherwise deposited in this mold. Then, after this layer has at least partially hardened, the individual cells 1 are juxtaposed bottoms down on the layer 15a in the side by side positions they are to occupy in the assembled battery B. Then an additional resin layer 15b to a desired depth, e.g., approximately 8 mm. is poured into or otherwise deposited in the mold 14 over layer 15a. This layer 15b fills adjoining interstices between the cells to approximately the same depth. The said layers 15a and 15b of resin which is of the thermosetting preferably epoxy type which polymerizes at room temperature now have a total depth of for example 10 mm. and together form the bottom resinous plate or plate-like body or member 15 of the battery. They are left in said mold 14 with the assembled group of cells 1 long enough for the said resin to harden, set and polymerize, forming a rigid unit consisting of resinous plate 15 in which cells 1 are embedded. This unit then can readily be handled and removed as an entity from the mold 14 and keeps its shape.

Figure 1:
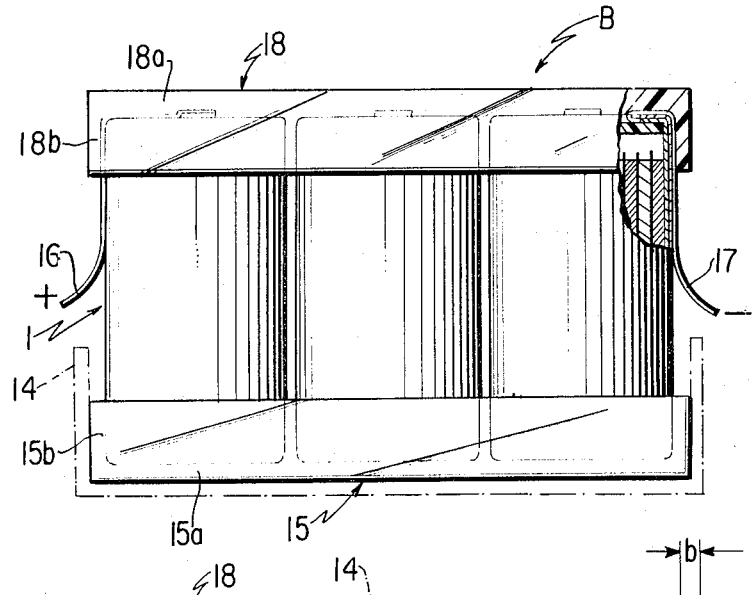
FIG. 1 is an elevational view, partially in section of a battery of juxtaposed cells prepared in accord with this invention.
Figure 2:
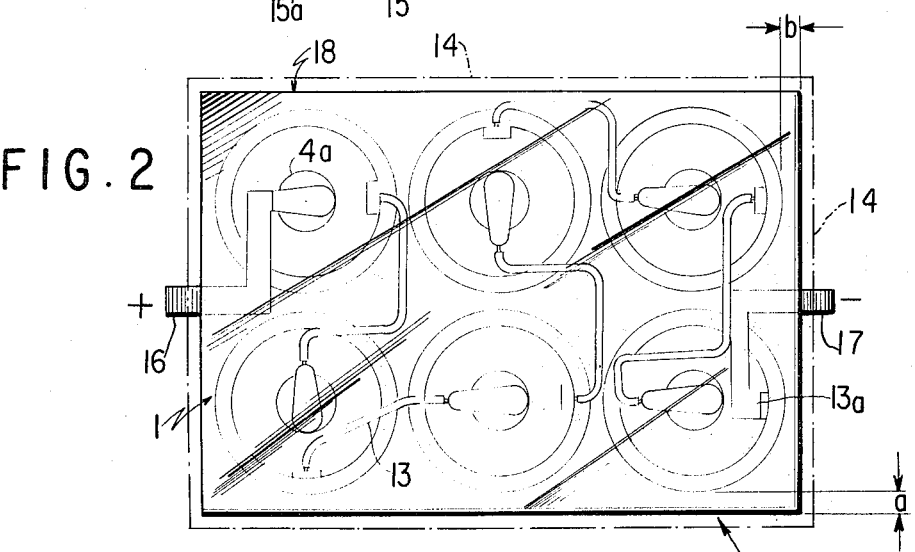
FIG. 2 is a plan view of the battery of FIG. 1.

Thereafter the individual cells are interconnected to form the desired series, or parallel, or series-parallel connections. To this end, in the case of series connection the conduits 13 of respective cells are electrically connected to the respective positive terminals or bosses 4 of adjacent cells as by welding or soldering thereto. The positive boss 4a of the first cell of the group is electrically connected to a positive battery terminal 16 while the negative conduit 13a of the final cell of the group is connected to a negative battery terminal 17 as seen in FIG. 2. If the cells are to be parallel connected, or series-parallel connected, appropriate modification of the interconnections of the cells is, of course, made before final connection to the positive and negative terminals 16 and 17.

Upon completion of the described electrical connections of the group of cells embedded in plate 15, the mold 14 or a similar one has a thin layer 18a of the said thermosetting epoxy resin poured into or otherwise deposited in it to a depth of, for example, approximately 2 mm. Then when this layer 18a has hardened, the inverted unit of cells held by plate 15 is positioned on this layer 18a in desired location and an additional resin layer 18b, for example, approximately 8 mm. deep is poured into or otherwise deposited in the mold over layer 18a. This second layer 18b fills interstices between adjoining cells and also embeds and covers the electrical conduits 13 and their joints with bosses 4. It also is of sufficient depth to cover or normally embed the upper ends of the cells of the group, so that if the seals normally provided by their gaskets 19 are in any way defective, the layer 18b forms an effective supplemental and remedial seal for the said cells. The major portion of battery terminals 17 and 18 are also embedded in layer 18b leaving only sufficient portions exposed at opposite sides for using the battery.

After said layer 18b has been deposited in the mold the assembly is left in position therein for a sufficiently long period to insure hardening, setting and polymerization of the resin at ambient or atmospheric temperature. The resinous plate or plate-like body or member 18 formed by the combined layers 18a and 18b after setting and polymerization forms a rigid support for the upper ends of the cells 1 forming the battery B, and with resinous plate 15 maintains said cells 1 as a rigid unit. It at the same time provides a supplemental seal for the gasket covers of the cells and also a rigid protective embedment for the conduits 13 and the terminals 16 and 17.

The dimensions of mold 14 are such that the respective plates 15 and 18 preferably project beyond the outer sides of the assembled cells forming a peripheral border a few millimeters thick at a and b at the sides of the battery so that battery B is completely protected against bumping or dropping shocks. The depths of the plate-like bodies or plates 15 and 18 while 10 mm. in the example described, can have any desired values sufficient to provide needed support and a strength according to the size of the cells, the depth of the example hereabove described being suitable for instance for F-size cells. The mold 14 used for formation of plate 15 or 18 may be provided with indicia of any desired kind in reverse so that legible indicia are formed on either of the plates as desired during their molding or other formation.

In the event that the resin used in molding of plates 15 and 18 is transparent or translucent the cell ends and embedded connections are visible or semi-visible in the respective plates.

Since the plates 15 and 18 are spaced apart and only the end portions of the cells are embedded in said plates 15 and 18, the surfaces of their major lengths are exposed to atmosphere which may circulate freely about them and through spaces existing between cells to provide air cooling of the latter. This is particularly advantageous in the case of storage cells during overcharging when the cells tend to overheat.

If desired either one of the plates 15 or 18 may be omitted. However, if only plate 15 is utilized, the upper ends of the cells and the electrical connections remain exposed, whereas if only plate 18 is used, the assembled cells would be less stable and less protected against shock.

While formation of the respective resinous plates has been described as a molding process with ambient temperature polymerization; their formation of other appropriate resins and in other ways as by pressure molding is contemplated within the scope of this invention.

Moreover, this invention is applicable to prismatic cells with square, rectangular, hexagonal, or other suitable sections, it being understood that in such event particularly, a slight spacing between adjacent individual cells is also provided during formation of the plate or plates 15 and 18 to permit free air circulation for cooling between such cells.

Although specific embodiments of the invention have been described, variations within the scope of the appended claims are possible and are contemplated. There is no intention of limitation to the exact abstract and disclosure herein made.

What is claimed is:

1. That improvement in the process of manufacturing a battery comprising providing a mold and a group of cells, depositing a layer of resin into said mold, allowing the layer to harden, then juxtaposing said cells in spaced relationship on said layer in said mold and thereafter depositing additional resin into said mold over said first layer to a desired depth to embed corresponding ends of the juxtaposed cells therein and form with said first layer a plate-like body, allowing said layers to set so that said plate-like body provides a rigid support for the said ends of said cells and maintains them as a unit and in spaced-apart condition to provide for air circulation between the cells, and then electrically interconnecting the cells to form the battery.

2. The improvement according to claim 1 wherein said resin is of the thermosetting epoxy type that polymerizes at ambient or room temperature.

3. The improvement according to claim 1 wherein said cells are of the sealed secondary type.

4. That improvement in the process of manufacturing a battery comprising providing a mold and a group of cells, depositing a layer of resin into said mold, allowing the layer to harden, then juxtaposing said cells in spaced relationship on said layer in said mold, thereafter depositing additional resin into said mold over said first layer to a desired depth to embed corresponding ends of the juxtaposed cells therein and form with said first layer a plate-like body, allowing said layers to set so that said plate-like body provides a rigid support for said cells at said ends thereof and maintains them as a unit and in spaced-apart condition to provide for air circulation between the cells, removing the unit from said mold, electrically interconnecting the cells adjacent their other ends to form the battery, pouring a resin layer in the mold, allowing said layer to harden, inverting the unit and depositing it on said last-named layer in said mold with the other ends of said cells resting on the latter layer, depositing additional resin layer over the latter layer in the mold to a desired depth to embed said other ends of said cells and the electrical interconnections therein and allowing said last-named layers to set and form a plate-like body about said other ends of said cells which is spaced from said first-named plate-like body, said two spaced plate-like bodies thus serving rigidly to maintain the juxtaposed cells as an assembled battery wherein cooling air may circulate about exposed spaced-apart cell portions between the spaced-apart plate-like bodies.

5. The improvement according to claim 4 wherein said resin is of the thermosetting epoxy-type that polymerizes at ambient or room temperatures.

6. The improvement according to claim 4 wherein said cells are of the secondary sealed type and wherein said second plate-like body provides additional sealing of the cells at said other ends thereof.

References Cited

UNITED STATES PATENTS

| | | | |
|---|---|---|---|
| 480,885 | 8/1892 | Usher | 136—81.2 |
| 1,606,391 | 11/1926 | Schulte | 136—108 |
| 2,209,927 | 7/1940 | Nichols | 136—108 |
| 3,110,634 | 11/1963 | Bradshaw | 136—108 |
| 3,178,317 | 4/1965 | Maddaloni | 136—173 |

FOREIGN PATENTS 493,276  8/1928  Germany.

WINSTON A. DOUGLAS, *Primary Examiner.*

D. L. WALTON, *Assistant Examiner.*